Oct. 24, 1950   F. FAHNOE   2,527,358
PROCESS OF PURIFYING PROPARGYL ALCOHOL
Filed Dec. 29, 1948
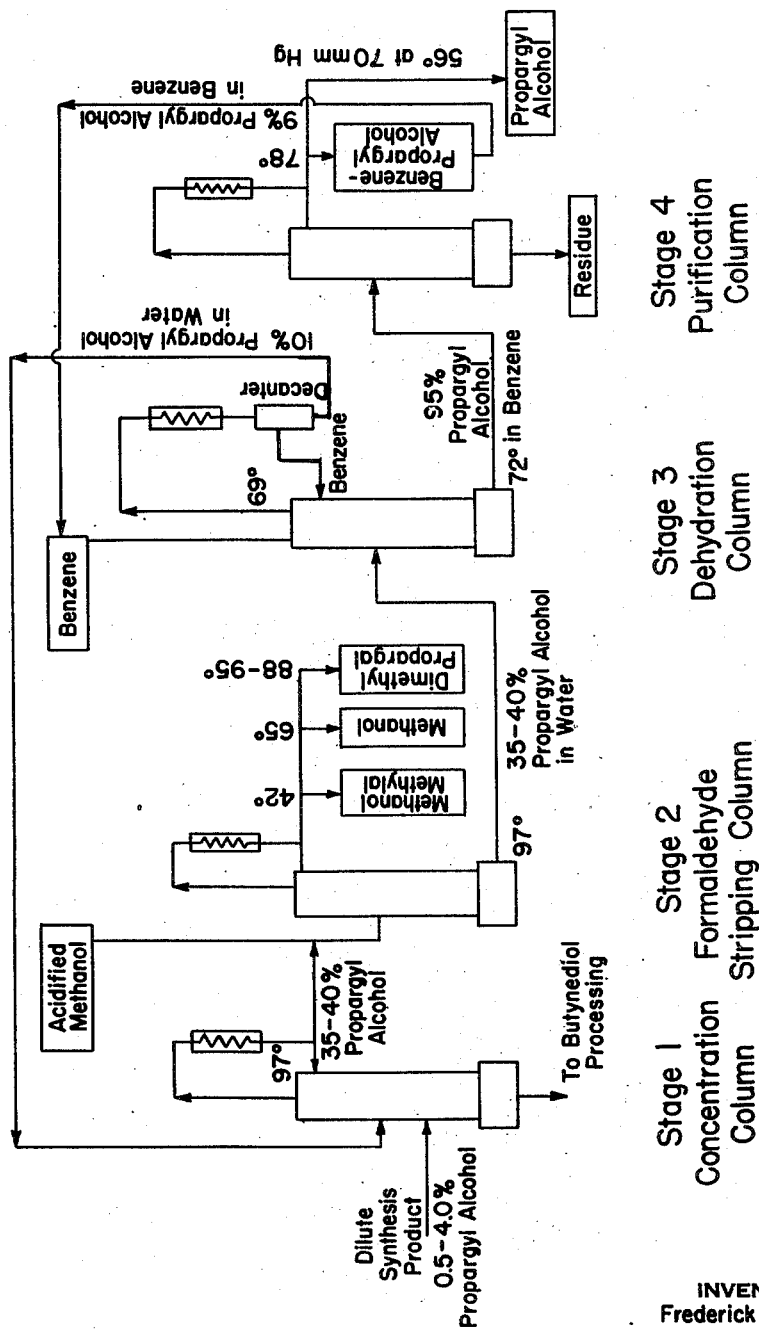
INVENTOR
Frederick Fahnoe
BY
Edward J. Willey
ATTORNEYS

UNITED STATES PATENT OFFICE 2,527,358

PROCESS OF PURIFYING PROPARGYL ALCOHOL

Frederick Fahnoe, Easton, Pa., assignor to General Aniline & Film Corporation, New York, N. Y., a corporation of Delaware Application December 29, 1948, Serial No. 67,981

4 Claims. (Cl. 202—42)

This invention relates to a process for purifying propargyl alcohol.

In the synthesis of butynediol, which is described generally in U. S. Patent 2,232,867, propargyl alcohol is produced as a bi-product to an extent varying between about 0.5 and 4.0% of the butynediol synthesis product.

Propargyl alcohol (2-propynol-1) is formed in that process with the presence of water, and is difficult to separate from the water since it forms a constant boiling azeotropic mixture with water containing 45.5% by weight of propargyl alcohol at 760 mm. pressure and boiling at 97° C. Various methods have been proposed for separating propargyl alcohol from water, but these processes have yielded propargyl alcohol with a maximum purity of only 97%.

It is an object of the present invention to provide a process for the preparation of substantially pure propargyl alcohol.

It is a further object of the present invention to provide a process for the preparation of propargyl alcohol of about 99.5% purity.

It is a further object of the present invention to provide a process for the removal from impure propargyl alcohol of formaldehyde reaction products.

It is a further object of the present invention to provide a process for the preparation of substantially pure propargyl alcohol by the removal of both formaldehyde reaction products and water from impure propargyl alcohol.

These and other objects are attained by the present invention which comprises an improved process for producing a substantially pure propargyl alcohol. It has been discovered that the impure propargyl alcohol obtained from butynediol synthesis contains besides water certain formaldehyde reaction roducts such as dimethyl propargyl, propargyl aldehyde and dipropargyl formal.

The invention is essentially concerned with the process comprising adding methanol to a propargyl alcohol-water azeotrope and preferably acidified methanol. The material is then distilled and the propargyl alcohol-water azeotrope which remains has been freed of formaldehyde reaction products.

The process for treating the product of the butynediol synthesis may more specifically be divided into four stages. In the first stage, the dilute synthesis product is distilled yielding a 35 to 40% propargyl alcohol azetrope in water and there remains synthesis product containing the butynediol. In the second stage, the propargyl alcohol azeotrope from the first stage is reacted with acidified methanol. Upon distillation, the second stage allows an overhead containing methanol reaction products and the higher boiling propargyl alcohol azeotrope remains. This azeotrope has now, however, had the propargyl alcohol-formaldehyde reaction products removed from it. In the third stage, benzene is added to the azeotrope and after distillation there remains a 95% propargyl alcohol-benzene solution, which in the fourth stage is distilled at a pressure of 70 mm. to obtain an overhead of propargyl alcohol of about 99.5% purity.

The particular novelty of the present process is concerned primarily with the novel acidified methanol distillation stage and particularly with the application of this stage between the initial propargyl alcohol concentration stage and subsequent dehydration and purification stages. In this manner, it has been found feasible to remove the small amounts of propargyl aldehyde which would otherwise carry through the entire process into the final propargyl alcohol. Also, the addition of acid at this stage stabilizes propargyl alcohol throughout the concentration and dehydration stages when it is very susceptible to decomposition by heat. Distillations performed in a neutral or alkaline medium may lead to decomposition yielding formaldehyde. The presence of formaldehyde in the advance stages of concentration results in the formation of dipropargyl formal which has a boiling of 175° C. This material, due to its very high boiling point, will remain in the pot in the final purification distillation, and being thermally unstable will tend to continually release formaldehyde which will contaminate the propargyl alcohol.

More particularly and with reference to the drawings, the process may be described in four stages as follows:

*Stage 1.—Separation and concentration*

The product from the butynediol synthesis containing 0.5% to 4.0% propargyl alcohol and containing a substantial amount of water is passed to a multi-plate distillation column. The vapor-liquid equilibria for the propargyl alcohol-water system is such that the concentration of very dilute solutions is relatively easy. The overhead from the still may contain 35% to 40% propargyl alcohol from even very dilute feed. The pot residue is forwarded for butynediol processing. When this stage is conducted as a batch distillation, the operation is easier to conduct as two separate distillations to avoid holding large pot charges of dilute feed.

Stage 2.—Formaldehyde stripping

Since the original synthesis product contains considerable unreacted formaldehyde, some of this formaldehyde is carried over into the overhead from the stripping column in Stage 1. It is important that this formaldehyde be removed before any further concentration of propargyl alcohol is attempted; the reason for this action is to preclude the formation of dipropargyl formal as an impurity in the final anhydrous propargyl alcohol. The disadvantages in its presence in the final purification column lie in the fact that under the acid conditions in the column which are necessary to stabilize propargyl alcohol it hydrolyzes slowly, tending to release formaldehyde which contaminates both the product and the column. Just where the dipropargyl formal is formed has not been determined. If the final propargyl alcohol distillation is too rigorous, local overheating in regions where there is no stabilizing acid present may decompose propargyl alcohol forming formaldehyde. The released formaldehyde may combine with the excess propargyl alcohol to form dipropargyl formal. It has also been determined that if the acidified propargyl alcohol-water concentrates are distilled with methanol the residual formaldehyde can be completely removed as methylal and little or no dipropargyl formal results in the final purification distillation. This treatment has, therefore, been incorporated into the concentration procedure as shown in Figure 1. Any further concentration of propargyl alcohol should be done in the presence of acid, since excessive decomposition will take place in neutral or alkaline media; accordingly, the addition of 1% hydrochloric acid and ½% succinic acid to the charge is made at this point. An acid such as hydrochloric acid is desirable to promote the formation of acetals; succinic acid is not strong enough to do this. Succinic acid is added to provide an acidic residue during the later purification stages when water is not present. It will be understood that other acid may be used. In place of hydrochloric, other strong mineral acids are useful and in place of succinic, if used at all, other organic acid may be substituted. Addition of about 10% by weight of the charge of methanol to an acidified water-propargyl alcohol solution followed by distillation provides an easy method for the removal of formaldehyde. Methanol under these conditions reacts with formaldehyde to form methylal which distills off as a methanol-methylal azeotrope (B. P. 42° C.). The residual methanol can then be distilled off in a pure form. It has been found uneconomical and unnecessary to treat the entire synthesis product in this manner; treatment of the overhead from the stripping column (Stage 1) performs the same function with a considerable economy of methanol. After the formaldehyde stripping operation in Stage 2, the distillation is continued to remove all overheads which boil in the range 88–95°, discontinuing this distillation when the overhead index of refraction $n_D^{25}$ rises to 1.3800 (equivalent to propargyl alcohol-water azeotrope) at 97° C.

It has been observed that the propargyl alcohol-water concentrates from the stripping column (Stage 1) possess a strong yellow coloration which carried through the dehydration into the resultant anhydrous propargyl alcohol. It was also observed that the longer the concentrates were stored the more pronounced the color became and the poorer the grade of propargyl alcohol that could be produced. The refractive indices and total analysis of supposedly pure propargyl alcohol were thus found to decrease as the age of the propargyl alcohol-water concentrates from which it was made increased. However, when the concentrates were treated by methanol distillation to remove the formaldehyde (Stage 2) it was found that the quality and color of the resultant propargyl alcohol immediately improved. Investigation of the products of the methanol distillation showed that after the methanol had been removed (B. P. 65° C.) a small amount of material distilled at 88–95° C. which was often two-phase and whose refractive index was less than that of the propargyl alcohol-water azeotrope ($n_D^{25}$—1.3821). From this fraction was isolated the compound dimethyl propargal. The overhead product in this range consists primarily of a ternary azeotrope of dimethyl propargal with propargyl alcohol and water. The presence of dimethyl propargal in the propargyl alcohol-water concentrates indicates that in some manner propargyl aldehyde has been formed. The amount of dimethyl propargal obtained has increased with the storage time of the propargyl alcohol-water concentrates; probably indicating partial oxidation of propargyl alcohol under the storage conditions. The formation of the ternary azeotrope, however, provides an easy method for removal of this constituent both in the acetal and aldehyde form. The removal of the fraction (B. P. 88–95° C. $n_D^{25}$ below 1.3800) in Stage 2 of the distillation was thus incorporated into the distillation procedure. It has been found that if dimethyl propargal is not removed prior to dehydration, it is retained with the propargyl alcohol and provides a very difficult removal problem in the purification stage due to the small difference in boiling points (111° C. for dimethyl propargal vs. 115° C. for propargyl alcohol). The presence of dimethyl propargal in the propargyl alcohol obtained from the final purification distillation tends to lower both the refractive index and ultimate analysis. However, removal of dimethyl propargal prior to dehydration resulted in a very pure grade propargyl alcohol (99.5% $n_D^{25}$ 1.4300+) from the purification stage. It is not known whether an azeotrope exists between the two materials but from existing distillation data its existence seems quite unlikely. The residue from Stage 2 is near azeotropic in composition and is concentrated as far as simple distillation can take it.

Stage 3.—Dehydration of propargyl-alcohol water azeotrope

The residue is, therefore, subjected to azeotropic distillation utilizing benzene as an azeotropic dehydrating agent (Stage 3). Sufficient benzene is added (approximately 10% by weight of the charge) to insure that the column is filled with the two-phase ternary azeotrope of benzene-propargyl alcohol-water boiling at 69° C. The overhead material is approximately azeotropic in composition, analyzing about 4% propargyl alcohol, 87% benzene and 9% water. Upon condensation it separates into two phases, 8–10% of a water-rich phase containing 10.1 wt. % propargyl alcohol and 90–92% of a benzene-rich phase containing about 3% propargyl alcohol. The benzene phase of the condensed overhead is refluxed to the column while the aqueous layer is returned to the original stripping column (Stage 1). Approximately 20% of the propargyl alcohol in the charge to the dehydration column is thus removed as the dilute aqueous solution, and must be recycled to the concentration column (Stage 1). It is evident that the composition of the charge supplied to the dehydration column should be as close to azeotropic (45.5% propargyl-alcohol in water) as is economically possible to obtain an efficient dehydration.

*Stage 4.—Final purification distillation*

The pot residue from the dehydration column is forwarded to a final purification column (Stage 4) where the residual benzene is removed as a binary azeotrope with propargyl alcohol (B. P. 78° C., 9% propargyl alcohol). This azeotrope is recycled for use in the dehydration stage and the propargyl alcohol in it is thus in effect recycled and not lost. After the complete removal of benzene as the binary azeotrope, the column is placed under a partial vacuum of 70 mm. of mercury and pure propargyl alcohol is recovered as overhead boiling at 56° C. The pot residue from Stage 4 is discarded; it consists primarily of small amounts of dipropargyl formal and condensation products which form viscous tars. The use of vacuum distillation for the final purification stage is desirable to avoid decomposition of the propargyl alcohol by heat. At this stage no water is present and the stabilizing effect of free hydrogen ions is lost. Local overheating of the distillation kettle will cause decomposition of propargyl alcohol to formaldehyde. The resultant formaldehyde will tend to form dipropargyl formal as well as tarry condensation products.

The resultant pure propargyl alcohol is very stable in storage over prolonged periods, no discoloration or decomposition being noted in three to four months storage time.

I claim:

1. In the process for the purification of propargyl alcohol obtained as a bi-product from butynediol synthesis, the step of removing formaldehyde reaction products which comprises distilling a solution of propargyl alcohol in water with acidified methanol, removing the overhead and leaving the purified propargyl alcohol water solution.

2. In the process for the purification of propargyl alcohol obtained as a bi-product from butynediol synthesis, the step of removing formaldehyde reaction products which comprises distilling a solution of propargyl alcohol in water with methanol acidified with hydrochloric and succinic acid, removing the overhead and leaving the purified propargyl alcohol water solution.

3. A process for the purification of propargyl alcohol obtained from butynediol synthesis, which comprises distilling the synthesis product from the butynediol process, adding acidified methanol to the overhead and re-distilling, passing this still residue containing propargyl alcohol in water to a third distilling column, adding benzene and distilling, removing the still residue of propargyl alcohol in benzene and distilling in a fourth distilling column under reduced pressure to obtain substantially pure propargyl alcohol as an overhead.

4. A process for purifying propargyl alcohol obtained as a bi-product from butynediol synthesis, which comprises distilling the butynediol synthesis product containing 0.5% to 4.0% propargyl alcohol in aqueous solution, passing the overhead containing 35% to 40% propargyl alcohol in aque-solution to a second distillation to which acidified methanol is added, distilling in said second distillation until formaldehyde methanol reaction products are removed as overhead, passing the residue from said second still comprising from 35% to 40% propargyl alcohol in water free of formaldehyde reaction products to a third distillation, adding benzene and distilling to obtain as an overhead a mixture of benzene and a dilute solution of propargyl alcohols in water, decanting and recycling said solution to said first distillation, removing the still residue from said third distillation comprising 95% propargyl alcohol in benzene to a fourth distillation, distilling under a pressure of about 70 mm. mercury to remove first benzene-propargyl alcohol which is recycled to the said third distillation and upon further distillation removing substantially pure propargyl alcohol.

FREDERICK FAHNOE.

REFERENCES CITED

The following references are of record in the file of this patent:

UNITED STATES PATENTS

| Number | Name | Date |
| --- | --- | --- |
| 1,911,798 | Buc | May 30, 1933 |
| 2,099,475 | Giesen et al. | Nov. 16, 1937 |
| 2,232,867 | Reppe et al. | Feb. 25, 1941 |

OTHER REFERENCES

Chemical Engineering, November 1946, page 244.